United States Patent [19]

Yohe et al.

[11] 4,170,067
[45] Oct. 9, 1979

[54] APPARATUS FOR MEASURING PIPE LENGTH

[75] Inventors: Robert A. Yohe; John F. McIver, both of Steelton, Pa.

[73] Assignee: Bethlehem Steel Corporation, Bethlehem, Pa.

[21] Appl. No.: 868,572

[22] Filed: Jan. 10, 1978

Related U.S. Application Data

[63] Continuation of Ser. No. 733,683, Oct. 18, 1976, abandoned.

[51] Int. Cl.² ............................................. G01B 7/02
[52] U.S. Cl. ............................... 33/143 L; 33/147 N; 33/174 L
[58] Field of Search ................. 33/143 L, 147 N, 158, 33/178 E, 147 L, 147 E, 143 R, 147 T, 174 L

[56] References Cited

U.S. PATENT DOCUMENTS

| 2,848,815 | 8/1958 | Scheu | 33/143 L |
| 3,649,820 | 3/1972 | Totsuka | 33/143 L |
| 3,681,582 | 8/1972 | Kimio et al. | 33/143 L |

Primary Examiner—Richard E. Aegerter
Assistant Examiner—Willis Little
Attorney, Agent, or Firm—Joseph J. O'Keefe; Michael J. Delaney; Anson W. Biggs

[57] ABSTRACT

A pipe is cradled at rest on a weighing scale at the end of a pipe mill production line. Pipe end sensors are driven axially in opposite directions until each one makes contact with an end of the pipe. Movement of each sensor toward an end of the pipe causes a pulse generator to produce pulses that decrement from a preset value indicative of the distance between two axially disposed reference points.

20 Claims, 7 Drawing Figures

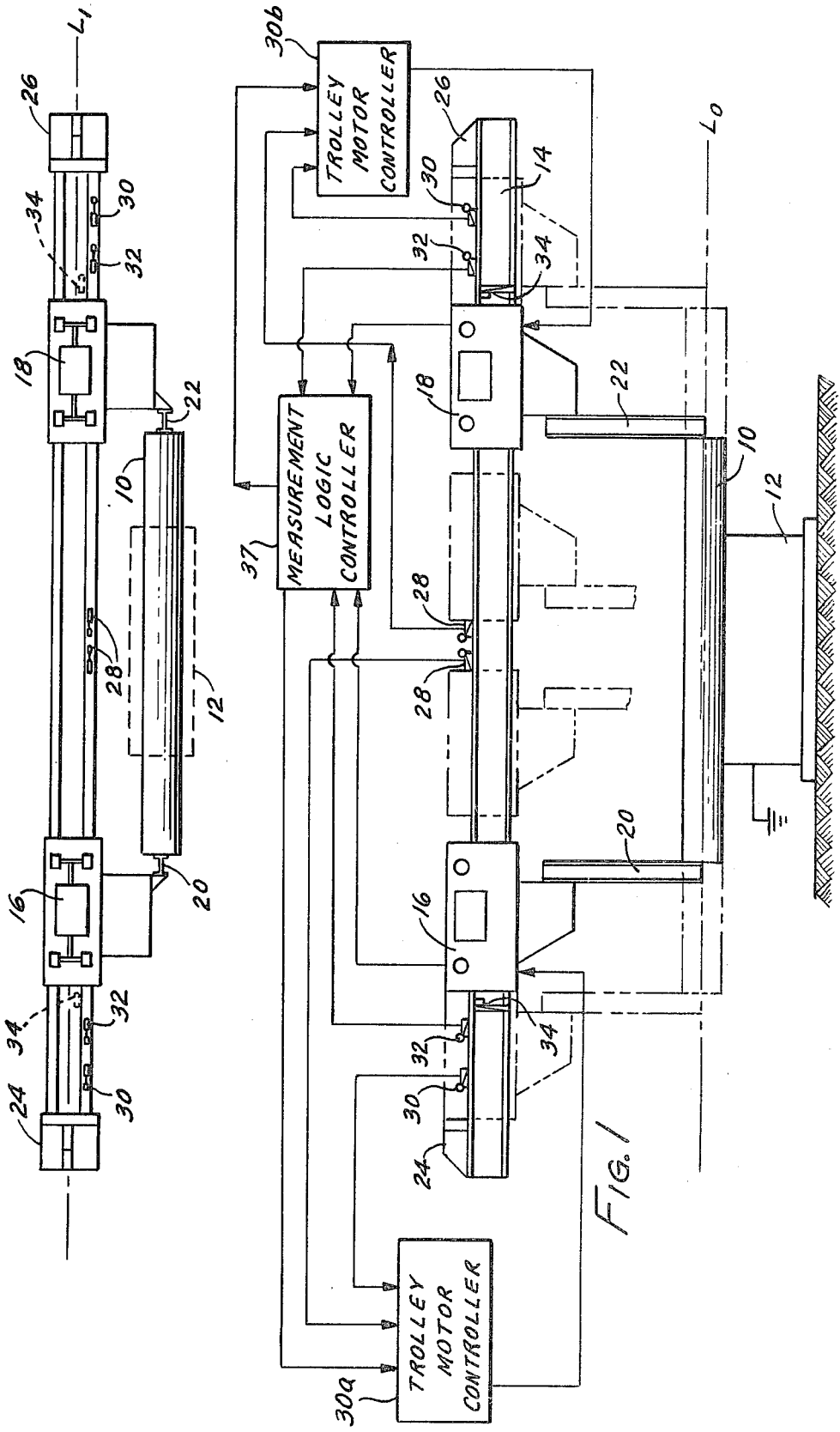

APPARATUS FOR MEASURING PIPE LENGTH

This is a continuation of application Ser. No. 733,683, filed Oct. 18, 1976, now abandoned.

BACKGROUND OF THE INVENTION

This invention relates to dimension measuring apparatus. More particularly, it relates to apparatus for digitally measuring the length of an object such as pipe.

In the production of large diameter pipe, each pipe is generally weighed and measured for length at the end of the production line. In the past, two men measured each pipe with a tape measure while the pipe was cradled in a weighing scale.

It is broadly old to digitally measure a dimension of an object by clamping the object between two sensors adapted to be driven along a common axis. In operation, the sensors are first caused to contact each other and a pulse count of zero is registered on a counter. The sensors are then separated, and pulses generated by each sensor are summed. The total number of pulses is then decremented as the sensors are moved toward each other until, upon clamping the object, a pulse number indicative of the measured dimension is registered.

Despite the foregoing, in the past no apparatus has been available for rapidly digitally measuring the length of large objects such as large diameter steel pipe. This pipe, which may be 14 to 80 feet long, must be accurately measured to within 5/100th of a foot.

It is an object of this invention to provide apparatus for accurately measuring a dimension along an axis of a relatively large object.

It is a more specific object of this invention to provide apparatus for accurately measuring the length of pipe.

SUMMARY OF THE INVENTION

We have discovered that the foregoing object can be obtained by providing track means above the object to be measured, the longitudinal axis of the track means being parallel to the axis of the object along which the measurement is to be taken. Means is disposed at each end of the track means defining a pair of first and second reference positions. First and second trolleys engage the track means and are each provided with sensor means for producing a signal when an end of said object is sensed. Position sensing means is associated with each of the trolleys for sensing these first and second reference positions. Each trolley is provided with drive means for driving it along the track means, and a pulse generator operatively connects each trolley to the track means whereby relative movement therebetween produces a predetermined number of pulses per unit length of movement. These pulses decrement a reversible pulse counter connected to the pulse generator.

Control means is provided for: (1) causing the drive means to drive each of the trolleys away from the object to the first reference position; (2) causing the drive means to drive each of the trolleys toward the object and past the second reference position; (3) initiating the decrementing of count from said pulse counter when said second reference position is first sensed by means on one of the trolleys; (4) continuing the decrementing of count from said pulse counter as long as the position sensing means on either of said trolleys has sensed said second reference position and the object sensor means on that trolley has not sensed an end of said object; (5) stopping the decrementing of count from said pulse counter when the sensor means on both trolleys have sensed an end of said object; and (6) displaying pulse count as length.

BRIEF DESCRIPTION OF THE DRAWINGS

FIG. 1 is a diagrammatic side elevation view of the apparatus of the invention.

FIG. 2 is a diagrammatic plan view of the apparatus shown in FIG. 1.

DESCRIPTION OF THE PREFERRED EMBODIMENT

Figure 3:
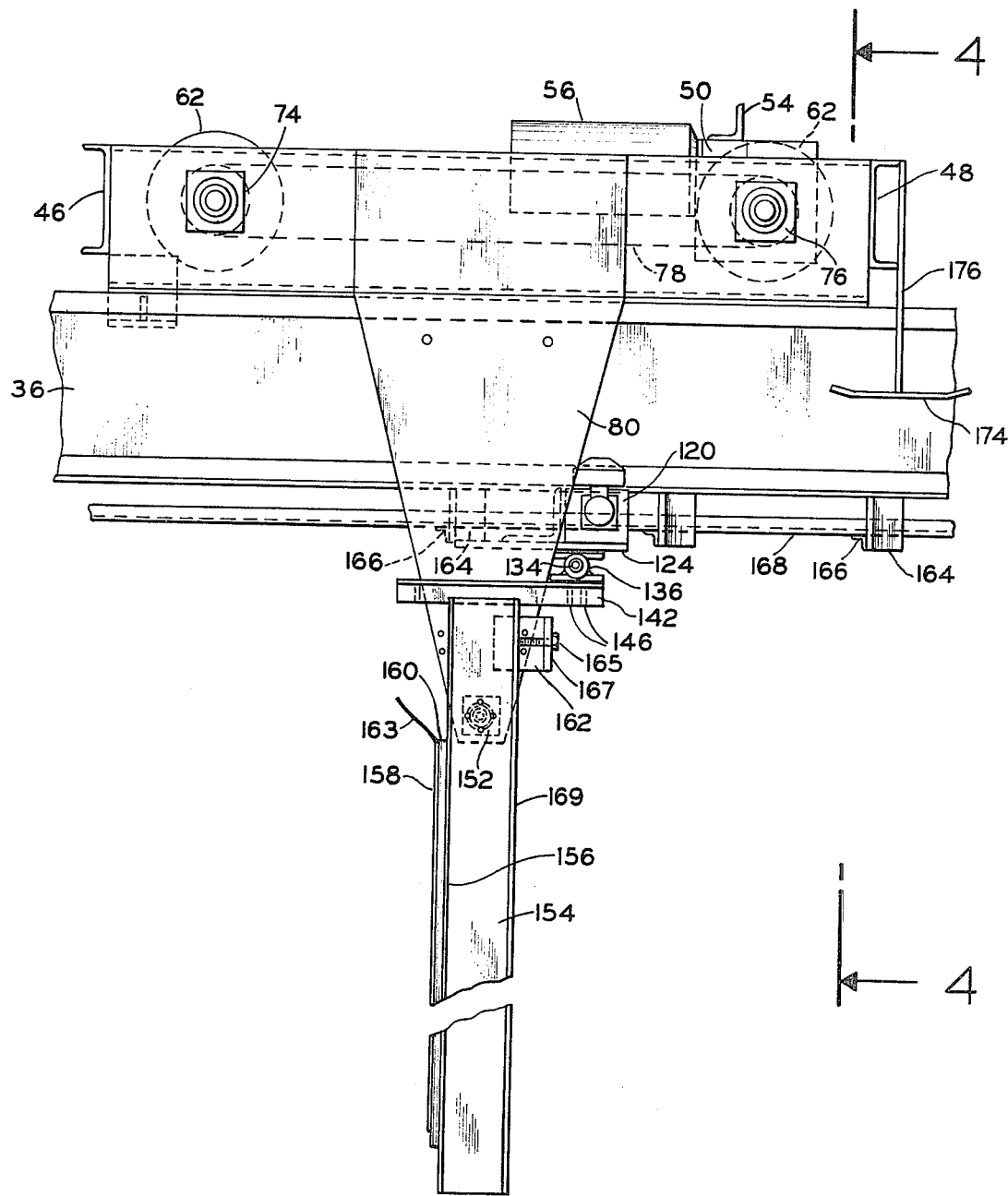
FIG. 3 is a side elevation view showing details of the invention.

Reference is made to FIGS. 1 and 2 where a pipe 10 is shown resting on a weighing scale 12. Located above the pipe 10, and having its longitudinal axis $L_1$ parallel to the longitudinal axis of the pipe $L_0$, is track means 14. First and second trolleys 16 and 18, respectively, engage the track means 14. Trolleys 16 and 18 are provided with sensor means 20 and 22, respectively, for sensing an end of the pipe.

Each trolley is provided with means, to be described in detail later in the specification, for driving the trolley along the track means and for generating pulses in response to relative movement between the trolley and the track means 14. Preferably, the number of pulses per unit length is divisible by 10, e.g., one pulse per 0.001 foot.

The track means 14 is provided with mechanical limit stops 24 and 26. In addition, four limit switches are provided for each trolley. Limit switches 28 and 30 are inner and outer emergency stop switches, respectively, that are actuated by a trip plate on the trolleys. These limit switches are connected to motor controllers 30a and 30b, respectively. Limit switch 32 defines a first reference position, also actuatable by this trip plate, from which the cycle of this invention normally starts. A magnet 34, adapted to be sensed by magnetism-sensitive means 35 on the trolley, defines a second reference position at which decrementing of the generated pulses commences. Magnet 34 combines with means 35 to function as a limit switch. The signals from switches 32 and means 35 are supplied to a measurement logic controller 37.

Broadly, the above-described apparatus operates substantially as follows. Upon operator initiation trolleys 16 and 18 are driven inwardly from limit switches 32. The distance between the sensor means 20 and 22 when the magnets 34 are opposite magnetic sensors 35 has been predetermined and is expressed in terms of a preset pulse count. As the magnetic sensors 35 on the trolleys pass magnets 34, which define a second reference position, pulses start decrementing from the preset pulse count. Decrementing continues for each trolley until the pipe end sensor means on that trolley contacts an end of the pipe. After the sensor means on both trolleys have contacted the ends of the pipe, the pulse count at that point is rounded to the nearest 0.05 foot, displayed to the operator, and transmitted to a computer (not shown). Each trolley is automatically reversed and retracted to its first reference position 32 after contact of its pipe end sensor means and an end of the pipe.

Figure 4:
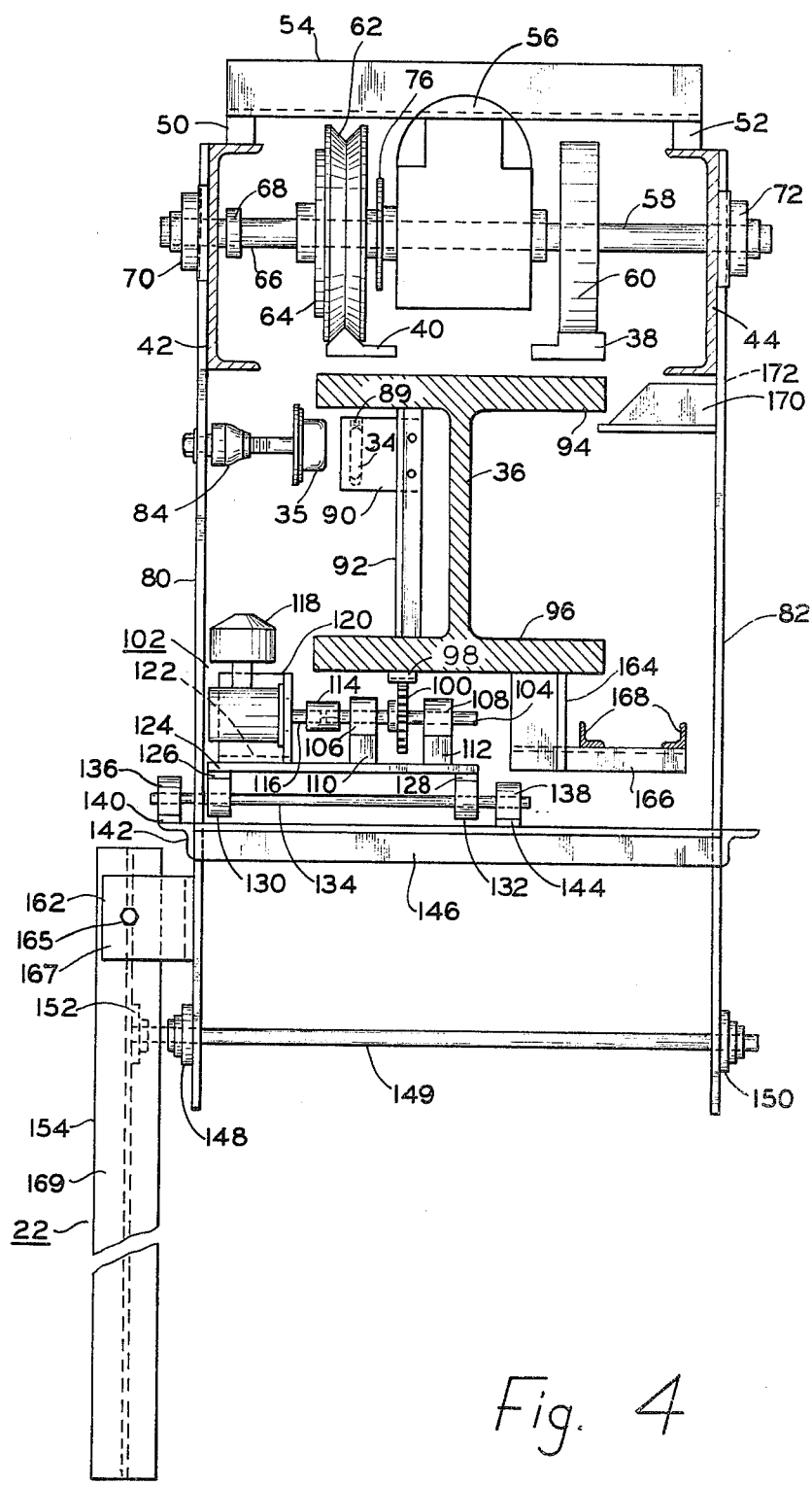
FIG. 4 is a sectional view along the lines 4—4 of FIG. 3.

Reference is here made to FIGS. 3 and 4. The track means 14 comprises an H-beam 36 having a flat rail 38 and a pyramidal rail 40 mounted thereon in parallel relationship. These rails are leveled by means of spacer bolts, not shown.

Each trolley 16, 18 comprises a framework consisting of side channels 42 and 44 and end channels 46 and 48. Affixed to the upper flanges of channels 42 and 44 are bars 50 and 52 across which a motor mounting bracket 54 extends. A hollow shaft direct current motor 56 is affixed to the bracket 54. The motor 56 is secured to shaft 58. The shaft 58 is secured to a flat-rimmed wheel 60 that rides along the flat track 38 and a V-grooved wheel 62 that rides along the pyramidal track 40. The shaft 58 is coupled by a coupling 64 to a shaft extension 66 provided with a thrust collar 68 passing through an opening in channel 42. Extension 66 is secured in a bearing 70. The shaft 58 passes through an opening in channel 44 and is secured in a similar bearing 72.

The opposite end of the trolley is provided with similar wheels and axles and is mechanically linked to the front axle by means of a sprocket 74 coupled to a sprocket 76 on shaft 58 by a chain 78.

Affixed to side channels 42 and 44 are hanger plates 80 and 82, respectively. Secured to plate 80 by a threaded insulator 84 is a magnetism-sensitive element 35 that produces a signal when it is opposite a magnet. Such a magnet 34 is sealed in a hole 89 drilled in a nonmetallic, nonmagnetic plate 90 that is secured to a bracket 92 disposed between the flanges 94 and 96 of H-beam 36.

Secured along the bottom of flange 96 is a rack 98 that engages a pinion 100 of pulse generating means 102. The pinion 100 is secured to a shaft 104 that passes through pillow blocks 106 and 108 that are secured to bars 110 and 112, respectively. The shaft 104 is coupled by coupling 114 to the shaft 116 of a pulse generator 118. The pulse generator is mounted on a bracket 120 that is bolted to a bracket 122 affixed to a base plate 124. Bars 110 and 112 are also affixed to base plate 124, which is secured through spacer plates 126 and 128 to pillow blocks 130 and 132, respectively. Pillow blocks 130 and 132 are coupled to a shaft 134 that is housed in pillow blocks 136 and 138. Pillow block 136 is secured through a spacer plate 140 to a bracket 142 welded to plate 80, whereas pillow block 138 is secured through a spacer plate 144 to a supporting bracket 146.

The center of gravity of the plate 124 and the parts secured thereto is such that, referring to FIG. 3, the plate tends to rotate counterclockwise about the axle 134. Thus, pinion 100 is constantly forced into intimate contact with rack 98 despite any waviness that may exist along the bottom of flange 96.

A shaft 149 passes through holes in plates 80 and 82 and is rotatably mounted in bearings 148 and 150. One end of the shaft is provided with a coupling 152 that is bolted to pipe end sensor means 22. Means 22 comprises an I-beam 154, affixed to one flange 156 of which is a brass contact plate 158 separated from the flange 156 by a rubber insulator 160. Also bolted to plate 80 is a bracket 162 that functions as a stop and limits rotation of I-beam 154. A bolt 165 threadedly engages flange 167 of bracket 162 and extends into contact with flange 169 of I-beam 154. A spring (not shown) is connected to I-beam 154 and maintains a force against I-beam 154 tending to rotate it clockwise against bolt 165. The purpose of bracket 162, bolt 165, and said spring is to keep sensor means 22 vertical until the contact plate 158 makes contact with an end of the pipe 10. The brass plate 158 is electrically connected by wire 163 to a high speed relay, not shown, that stops inward movement of the trolley immediately upon contact between the plate 158 and an end of the pipe 10, said pipe being electrically grounded through the scale 12. For example, a Cutler-Hammer transistorized relay having a response time of 4 milliseconds is suitable.

Affixed to the underside of lower flange 96 of H-beam 36 is a plurality of brackets 164 to each one of which a supporting bracket 166 is attached. Supported on brackets 166 is a pair of guide brackets 168 for a movable electrical wire support assembly, not shown, that is connected to a bracket 170 affixed to a plate 172 welded to side channel 44. This assembly provides power to the motor 56 and communication between the plate generating means 102 and the control circuits of the invention.

A limit switch trip plate 174 is attached to a plate 176 connected to end channel 48. This trip plate 174 actuates one set of the limit switches 28, 30, and 32.

Figure 5:
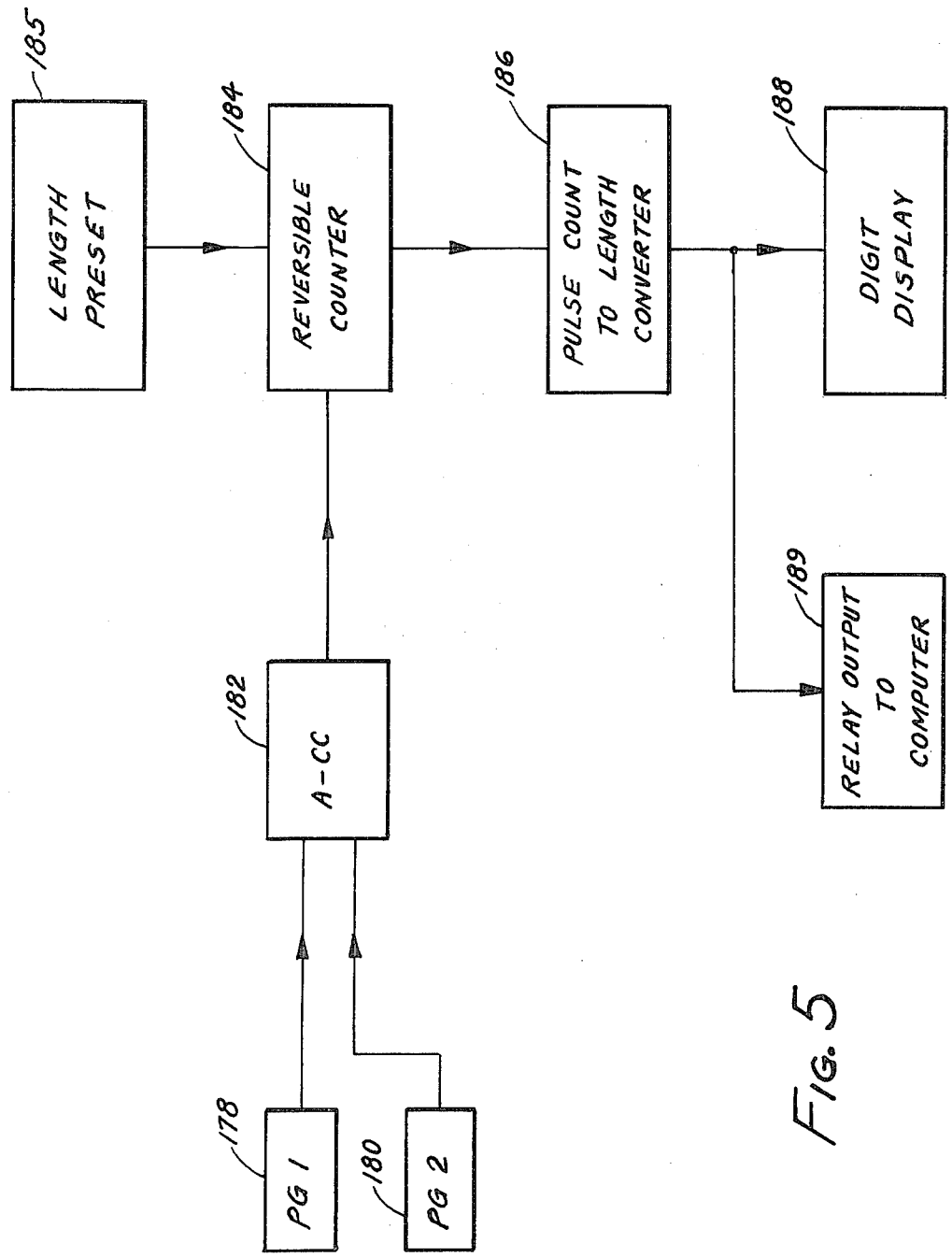
FIG. 5 is a block diagram of the counting circuit of the invention.

Reference is made to FIG. 5, which shows very broadly the electronics of the counting circuit of the invention. As shown, pulse generator circuits 178 and 180 supply pulses to an anticoincident circuit 182. Circuit 182 permits both trolleys 16 and 18 to be driven inwardly simultaneously. Pulses from circuit 182 are sent to a reversible counter 184 that starts to decrement from a preset number of pulses as soon as one of the trolleys passes magnet 34. The reversible counter 184 is preset by means of a thumbwheel on length preset 185. Decrementing continues until both sensor means 20 and 22 make contact with an end of the pipe 10. The output from the counter 184 is then rounded from 0.001 foot to nearest 0.05 foot, by circuit 186. This length is displayed in digit display 188 and sent to a computer through relay output 189.

Figure 6:
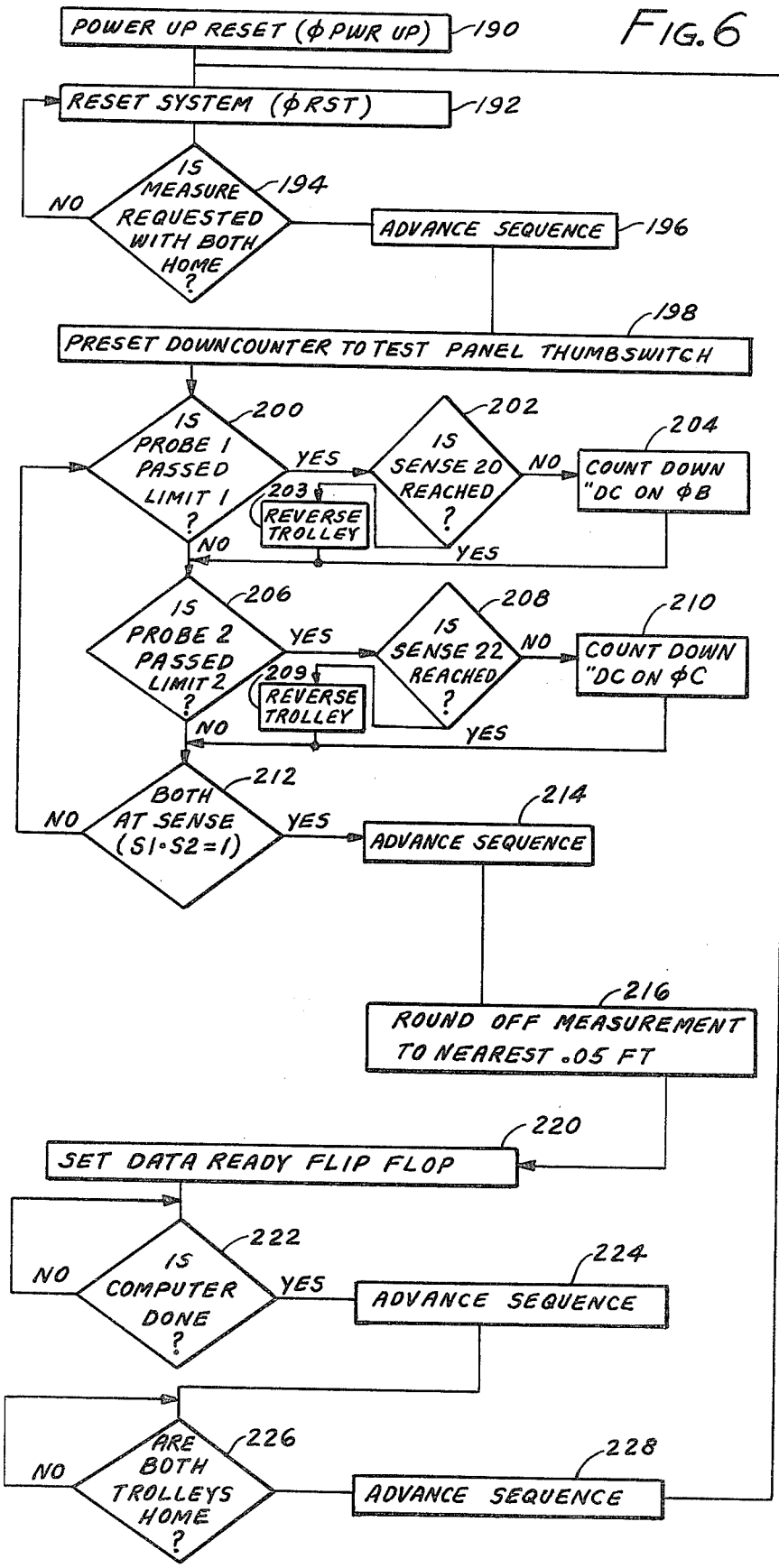
FIG. 6 is a flow chart of the logic of the invention.

Reference is made to FIG. 6, which shows the logic flow of the subject invention. The operation of the apparatus is controlled by a hard wired digital logic system. The various operating steps are controlled by a clock having four phases, viz., $\phi A$, $\phi B$, $\phi C$ and $\phi D$. Two of these phases are necessary for anticoincidence of the pulses from the two pulse generators. A third phase prevents advancing of a sequence while a pulse is being counted, whereas a fourth phase is used since a three phase digital clock is much more difficult to design than a four phase clock.

Basically, the operating steps can be classified into the four sequences shown in FIG. 6. Sequence 1 prepares the system for start-up. Block 190 resets all the circuits of the subject invention. Block 192 then causes the reversible counter to be reset to zero and the trolleys 16 and 18 to be driven outwardly toward their first reference point, viz., "home", if they are not already there. Block 194 asks the question whether the measurement is requested with both trolleys home. If not, the program causes block 192 to keep functioning. If affirmative, block 196 causes the program to advance to sequence 2. As shown, sequence 1 functions only during $\phi D$ of clock rotation.

During $\phi A$ of sequence 2 the pulse counter is preset by block 198 to read the number of pulses equivalent to the distance between the second reference points on the track means. This pulse number is determined during system calibration and is preset by the apparatus operator by turning thumbwheel switches on length preset 185.

The logic then switches to φB of sequence 2 and block 200 asks whether the magnetic sensor 35 on trolley 16, referred to in the flow sheet as probe 1, has passed the magnet 34 (Limit 1) that defines the second reference point. If the answer is "yes", block 202 asks whether sensor 20 has sensed an end of the pipe 10. If the answer is "no", block 204 causes the pulse counter to decrement. If the answer is "yes", decrementing by this pulse generating means stops, and block 203 causes trolley 16 to reverse.

Blocks 206, 208, 209, and 210 perform the same functions during φC as blocks 200, 202, 203, and 204 performed during φB, but relate to trolley 18.

If the answer to the question posed by blocks 200 or 206 is "no", decrementing by blocks 204 and 210, respectively, is not initiated.

During φD of sequence 2, block 212 asks whether both sensor means 20 and 22 have sensed an end of the pipe 10. If either sensor hasn't, φB and φC are repeated until the answer is "yes", at which time block 214 advances the logic to sequence 3.

Sequence 3 rounds off the measurement obtained during sequence 2, provides a visual display to the operator, and provides relay interface of data for the computer. During φC, block 216 rounds the least 3 significant digits [0.001] to 0.05 foot. For example, a measurement of 40.0750 ft. would be rounded off to 40.10 ft., whereas a measurement of 40.0740 ft. would be rounded off to 40.05 ft.

During φD of sequence 3, block 220 provides information to the computer, allowing it to input the measurement data, and block 222 triggers block 224 to advance the sequence after the measurement has been input by the computer.

During sequence 4, block 226 prevents block 228 from advancing the sequence until both trolleys 16 and 18 have been driven outwardly to reference position 1.

Figure 7:
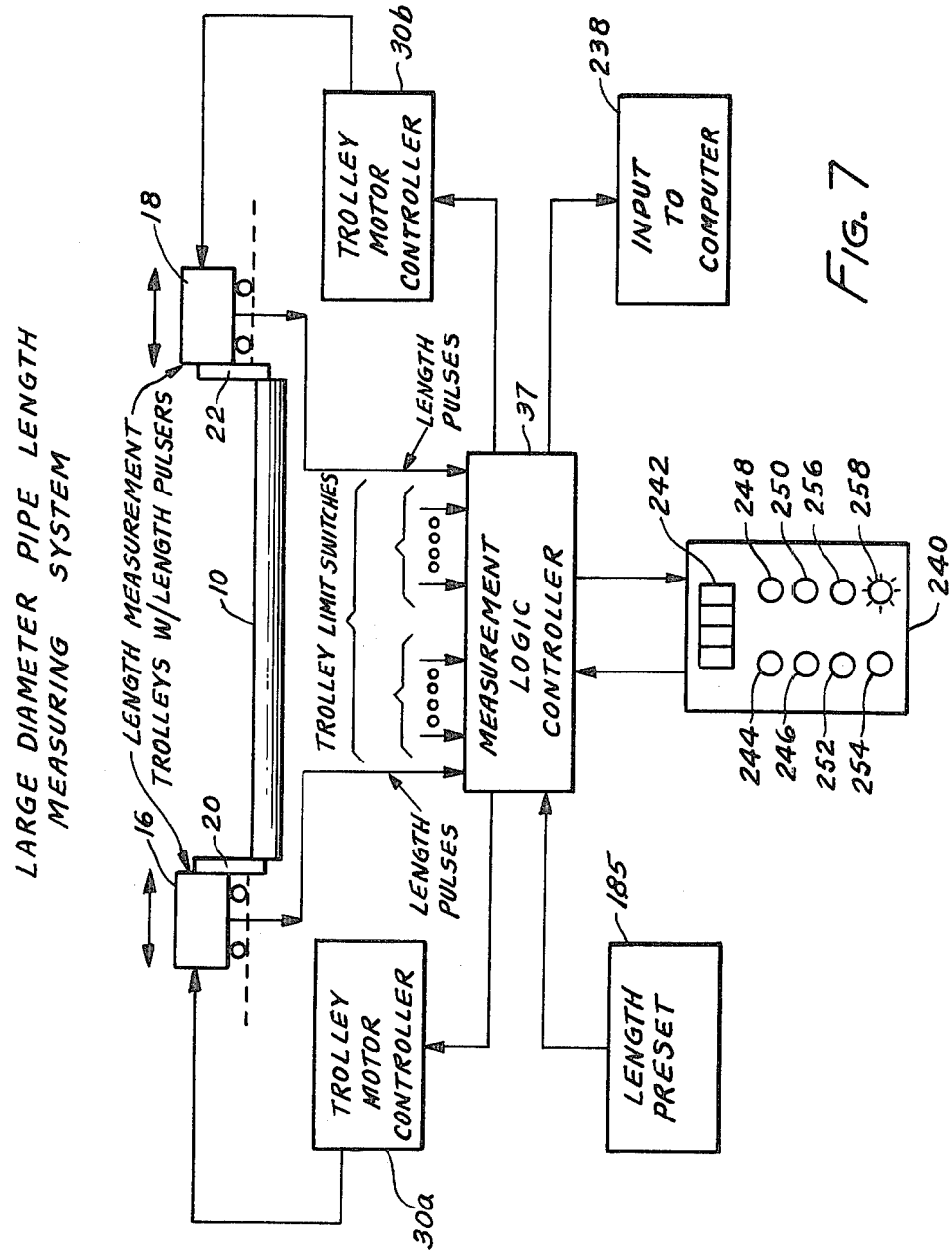
FIG. 7 is a block diagram of the control circuits of the invention.

As shown in FIG. 7, each trolley 16 and 18 is provided with a conventional motor control circuit 30a and 30b, respectively. These circuits 30a and 30b are connected to the measurement logic controller 37, a portion of the flow sheet of which was just described. Signals from the pulse generating means 102, sensor means 20 and 22 and the limit switches 28, 30, 32, and 34-35 are also supplied to the measurement logic controller 37. Controller 37 is a hard wired digital logic system. In addition, the length preset device 185 supplies a signal indicative of the number of pulses separating the magnets 34 from each other. The logic controller 37 is connected to a computer input device 238.

An operator's console 240 is connected to the logic controller 37. This console is provided with a 4-digit length decimal readout 242, seven control buttons and one light. Buttons 244 and 246 are jog forward and jog reverse buttons, respectively, for trolley 16, whereas buttons 248 and 250 are jog forward and jog reverse buttons, respectively, for trolley 18. Button 252 causes the trolleys to move outwardly into their reset, or initial position, and button 254 is an emergency stop button. Button 256 requests a measurement to be taken, and light 258 informs the operator that the measurement data is ready for the computer.

We claim:
1. Length measuring apparatus, comprising:
(a) first and second trolley means each adapted to be reversibly positioned lengthwise relative an object to be measured, each said trolley means initiating at least one corresponding reference position signal during movement,
(b) first and second end object detector means carried respectively by said first and second trolley means and adapted to produce an object end detecting signal,
(c) first and second pulse generator means each operative in response to movement of a respective trolley means for generating respective length measurement pulse sequences,
(d) measurement logic controller means receiving the reference position signals, the object and detecting signals and the length measurement pulse sequences for controlling movement of the trolley means and converting the length measurement pulse sequences into an overall pulse count, whereby at least the control function occurs in a predetermined logical sequence,
(e) each trolley means initiates a plurality of reference signals, and means (d) control is circuited to use the plurality of reference signals in a predetermined logical sequence, and
(f) means for utilizing the overall pulse count as a function of object length.

2. The apparatus of claim 1 wherein each trolley means is powered and means (d) control is circuited to cause first and second trolley means movement toward and away from each other in response to external start and return signals, respectively.

3. The apparatus of claim 2 wherein either or both the external start or return signals is operator initiated.

4. The apparatus of claim 2 wherein at least one reference signal initiated by trolley means movement relates to maximum object length, means (d) control is circuited to cause first and second trolley means movement toward and away from each other in response to external start and return signals, respectively, and means (d) measuring is circuited to decrement pulse counts from a preset maximum length value in response to initiation of the maximum length measuring reference signal.

5. The apparatus of claim 1 wherein means (d) is so circuited as to permit object length measurement anywhere between said reference positions.

6. The apparatus of claim 1 wherein means (d) is so circuited that both control and measurement functions occur in a predetermined logical sequence.

7. The apparatus of claim 1 wherein means (d) measuring is circuited to decrement pulse counts from a preset maximum length value.

8. The apparatus of claim 1 wherein each trolley means includes a track and toothed rack, both extending lengthwise of the object, and each pulse generator means includes a pinion drive coupled to a respective toothed rack.

9. Length measuring apparatus, comprising:
(a) first and second powered trolley means each adapted to be reversibly positioned lengthwise relative an object to be measured, each said trolley means initiating at least a maximum length-measuring reference position signal during movement,
(b) first and second object end detector means carried respectively by said first and second trolley means and adapted to produce first and second object end detecting signals,
(c) control means for reversibly controlling movement of each said powered trolley means toward and away from each other in response to the maximum length-measuring reference position signals, said control means circuited to:
  (0.1) start each said trolley means moving away from a respective one of said reference positions toward a pipe end in response to a start signal,
  (0.2) stop each said trolley means movement in response to a corresponding first or second object end detecting signal, and
  (0.3) return each said trolley means to its respective measuring reference position in response to a return signal,
(d) first and second pulse generators driven by corresponding first and second trolley means, each pulse generator producing a respective length measurement pulse sequence during trolley movement between the maximum length measuring reference position and an object end,
(e) measuring circuit means having pulse counting means including a reversible pulse counter for accommodating pulses from said first and second pulse generators, thereby developing an overall pulse count of object length when the object is located anywhere between said reference positions, and
(f) means for utilizing the overall pulse count as a function of object length.

10. The apparatus of claim 9 wherein the first and second trolley means and control means are adapted to be powered and controlled independently of each other.

11. The apparatus of claim 10 wherein the first and second powered trolley means are adapted to move over track means located parallel to a length measuring axis of the object.

12. The apparatus of claim 9 wherein overtravel of each of the first and second powered trolley means is limited at one end by a stop member located beyond a respective length-measuring reference position.

13. The apparatus of claim 9 wherein at least one of the object end detector means includes a pivotal arm suspended from a respective trolley means for causing the production of a respective end detecting signal.

14. The apparatus of claim 9 wherein the control means is circuited to initiate operation of the pulse counting means when a predetermined position is sensed by one of the trolley means.

15. The apparatus of claim 14 wherein the control means is further circuited to continue operation of the pulse counting means until the respective object end detecting signal is produced.

16. The apparatus of claim 9 wherein the control means is circuited to provide operator initiated start or return signals, or both the start and return signal.

17. The apparatus of claim 9 wherein each trolley means initiates a plurality of reference signals and the control means is circuited to use the plurality of reference signals in a predetermined logical sequence.

18. The apparatus of claim 9 wherein the control means and the measuring circuit means are so circuited that both functions occur in a predetermined sequence.

19. The apparatus of claim 9 wherein the measuring circuit means is circuited to decrement pulse counts from a preset maximum length value.

20. The apparatus of claim 9 wherein each trolley means includes a lengthwise track and toothed rack, and each pulse generator means includes a pinion drive coupled to a respective toothed rack.

* * * * *